United States Patent [19]
Tal

[11] Patent Number: 5,424,709
[45] Date of Patent: Jun. 13, 1995

[54] CIRCUIT FOR PROVIDING ISOLATION BETWEEN COMPONENTS OF A POWER CONTROL SYSTEM AND FOR COMMUNICATING POWER AND DATA THROUGH THE ISOLATION MEDIA

[75] Inventor: Rony Tal, Cupertino, Calif.

[73] Assignee: IXYS Corporation, Santa Clara, Calif.

[21] Appl. No.: 52,847

[22] Filed: Apr. 26, 1993

Related U.S. Application Data

[60] Division of Ser. No. 668,374, Mar. 11, 1991, abandoned, which is a continuation of Ser. No. 511,871, Apr. 19, 1990, abandoned, which is a continuation of Ser. No. 208,157, Jun. 17, 1988, abandoned.

[51] Int. Cl.[6] ........................................... H04M 11/04
[52] U.S. Cl. .............................. 340/310.01; 340/538
[58] Field of Search ............ 340/310 R, 310 A, 825.2, 340/825.21, 538; 370/106; 364/550

[56] References Cited

U.S. PATENT DOCUMENTS

| | | | |
|---|---|---|---|
| 3,967,264 | 6/1976 | Whyte et al. | 340/310 A |
| 3,973,240 | 8/1976 | Fong | 340/310 A X |
| 4,012,733 | 3/1977 | Whyte | 340/310 A |
| 4,121,113 | 10/1978 | White et al. | 340/310 R X |
| 4,302,750 | 11/1981 | Wadhwani et al. | 340/310 A X |
| 4,316,262 | 2/1982 | Mizuta et al. | 340/310 A X |
| 4,377,804 | 3/1983 | Suzuki | 340/310 A |
| 4,583,221 | 4/1986 | Uchida et al. | 370/106 |
| 4,593,380 | 6/1986 | Kocher et al. | 364/900 |
| 4,596,981 | 6/1986 | Ueno et al. | 340/825.2 |
| 4,845,466 | 7/1989 | Hariton et al. | 340/310 R |
| 4,885,563 | 12/1989 | Johnson et al. | 340/310 A |
| 4,952,905 | 8/1990 | Oliver | 340/310 R |

*Primary Examiner*—Hezron E. Williams
*Assistant Examiner*—Christine K. Oda
*Attorney, Agent, or Firm*—Townsend and Townsend Khourie and Crew

[57] ABSTRACT

An industrial automation system using transformers for providing electrical isolation between a system interface chip and a load interface chip while simultaneously allowing communication of power and data across the isolation barrier. Clock pulses are transmitted from the system interface chip to the load interface chip across one transformer, and the clock pulses are used by the load interface chip to create a power supply for operating the components within the chip. Data is communicated from the system interface chip to the load interface chip across a second transformer by the use of messages. Each message comprises a bit sync field, a byte sync field, and a data field. The bit sync field and byte sync field are used by the load interface chip to synchronize itself with the system interface chip. Transmission and reception of data by the chips are interleaved on a bit-by-bit basis, wherein a bit is transmitted from the load interface chip to the system interface chip after each bit is transmitted from the system interface chip to the load interface chip. After each byte of data is transmitted and received by the chips, the load interface chip eliminates synchronization between the chips, and must resynchronize itself with the system interface chip in order to transmit and receive the next byte of data.

4 Claims, 6 Drawing Sheets

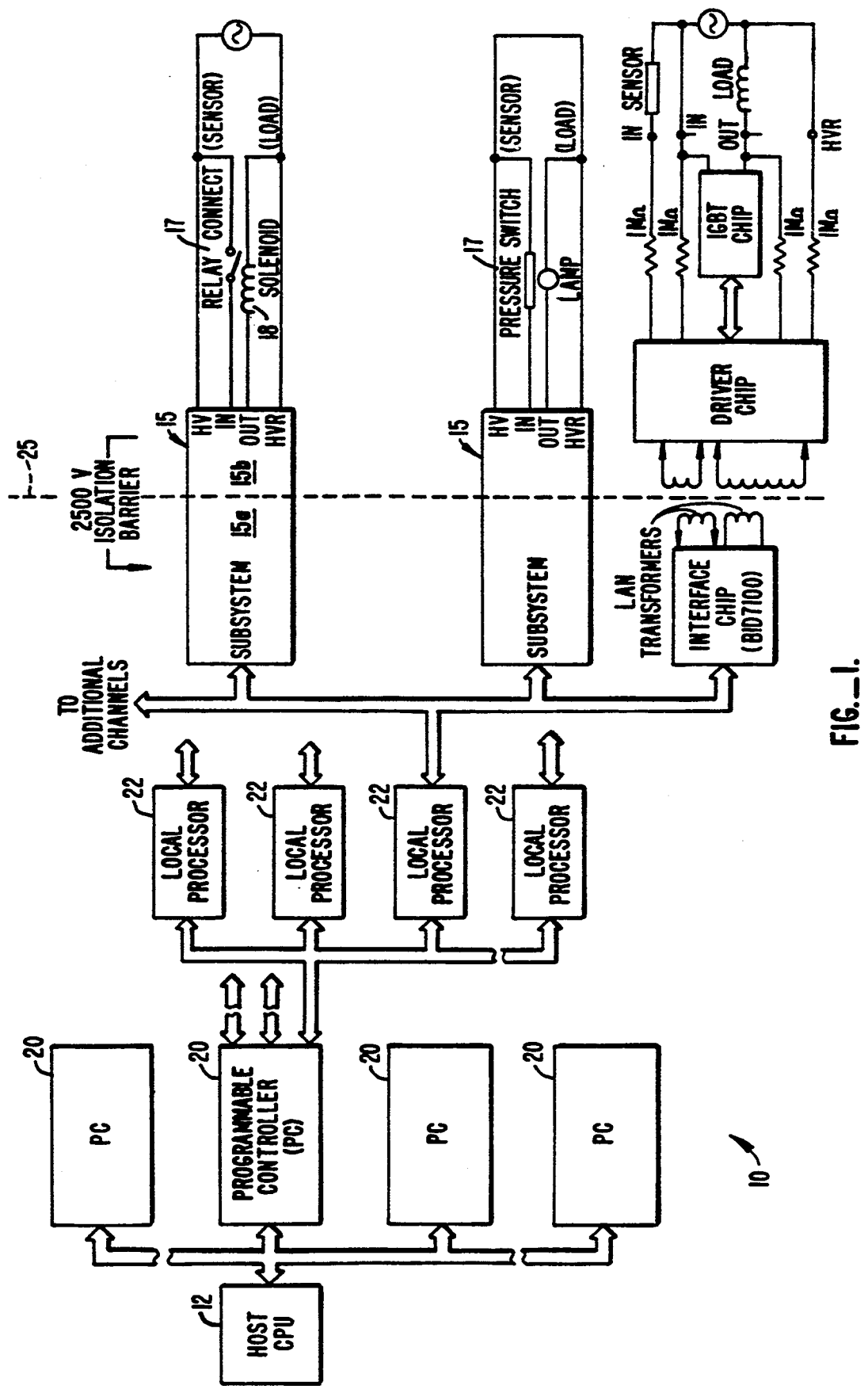
FIG._1.

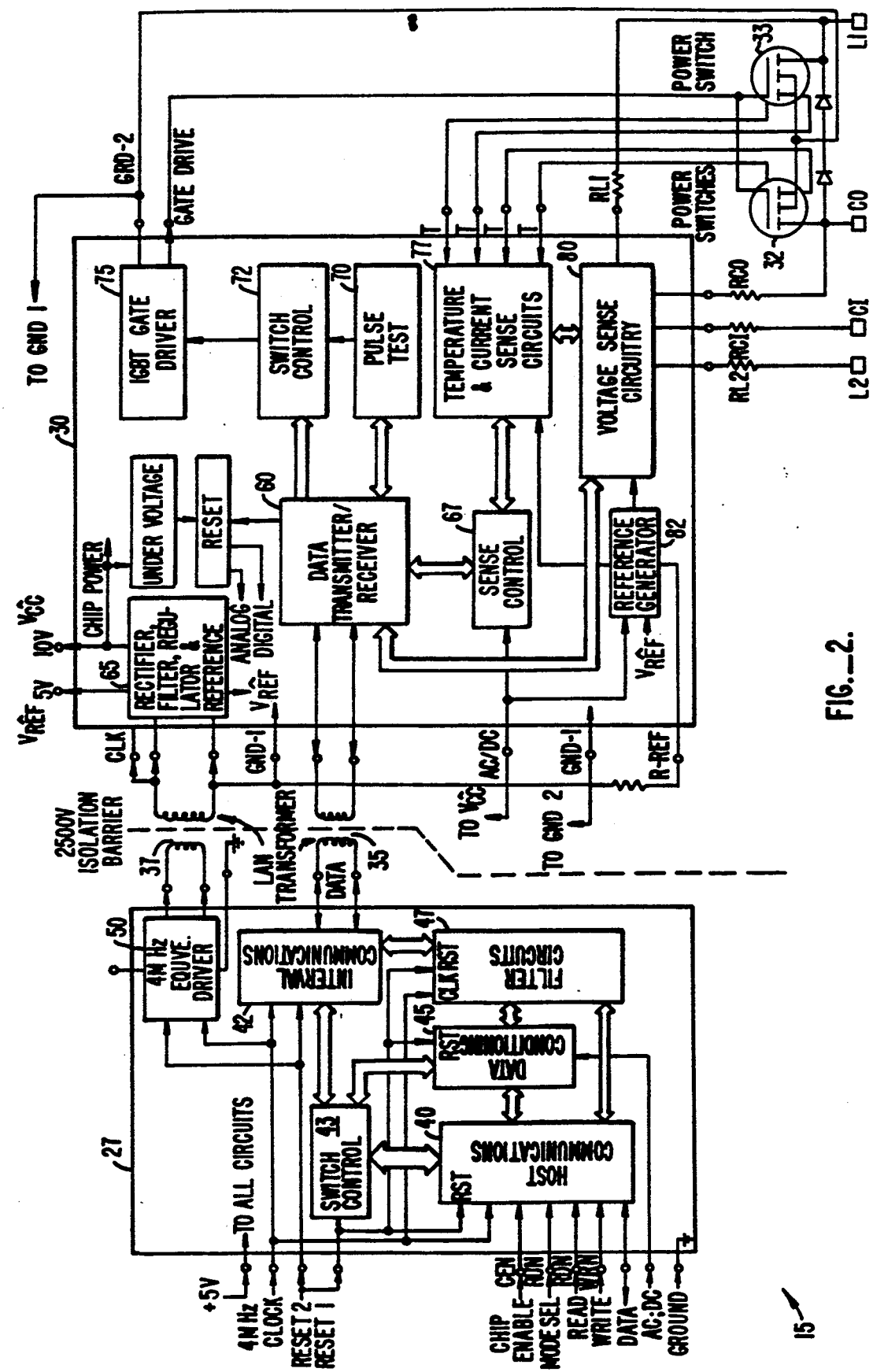
FIG._2.

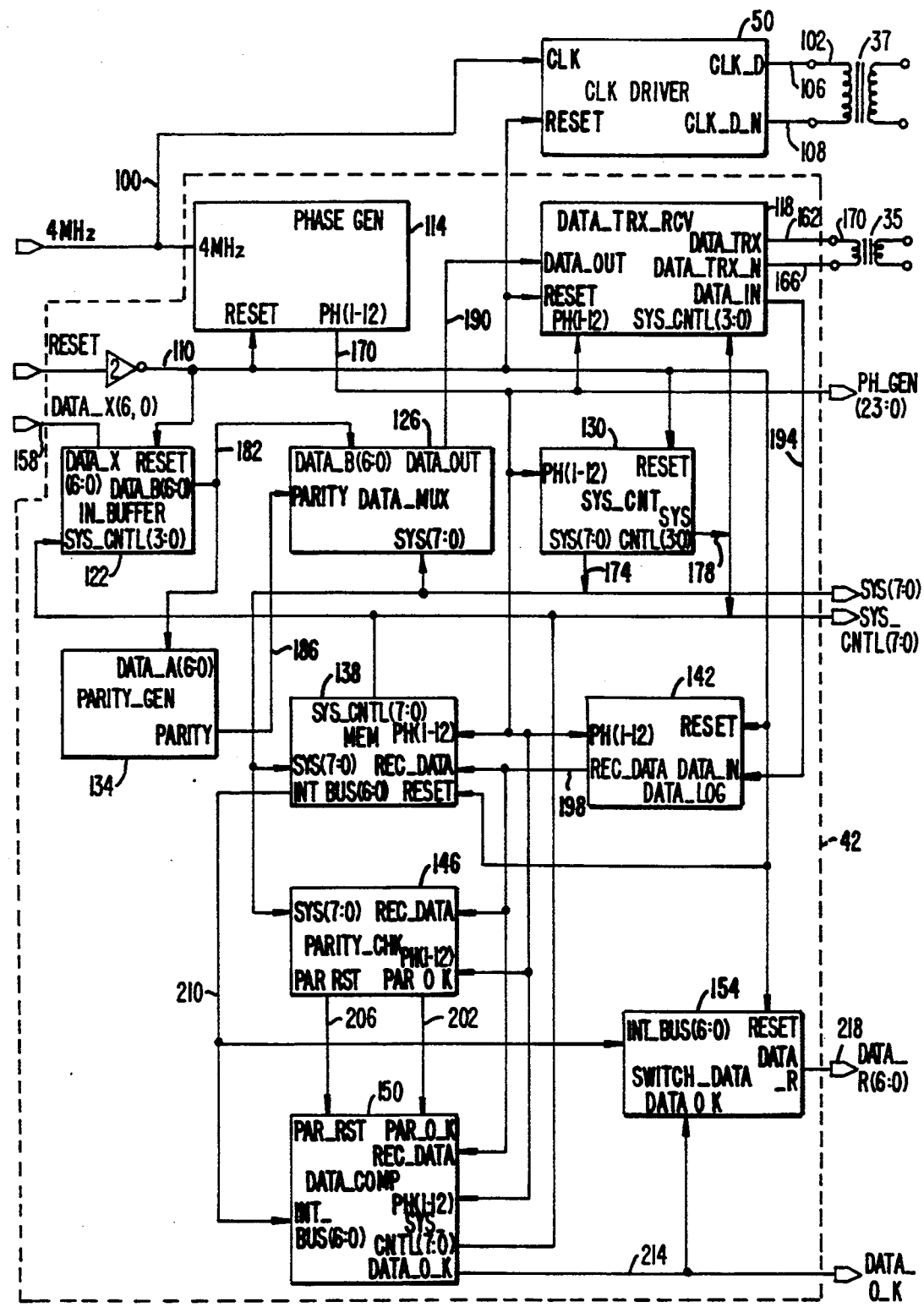
FIG._3.

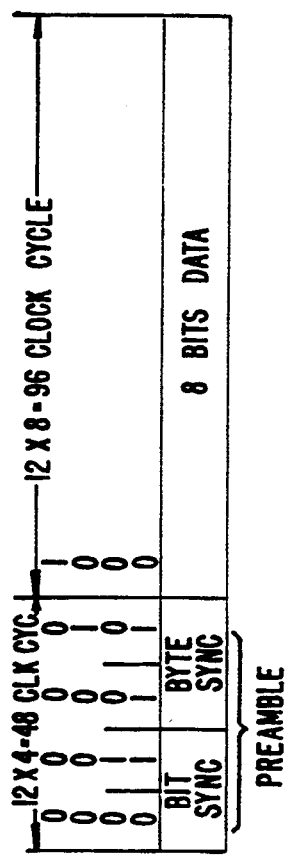
FIG._5.
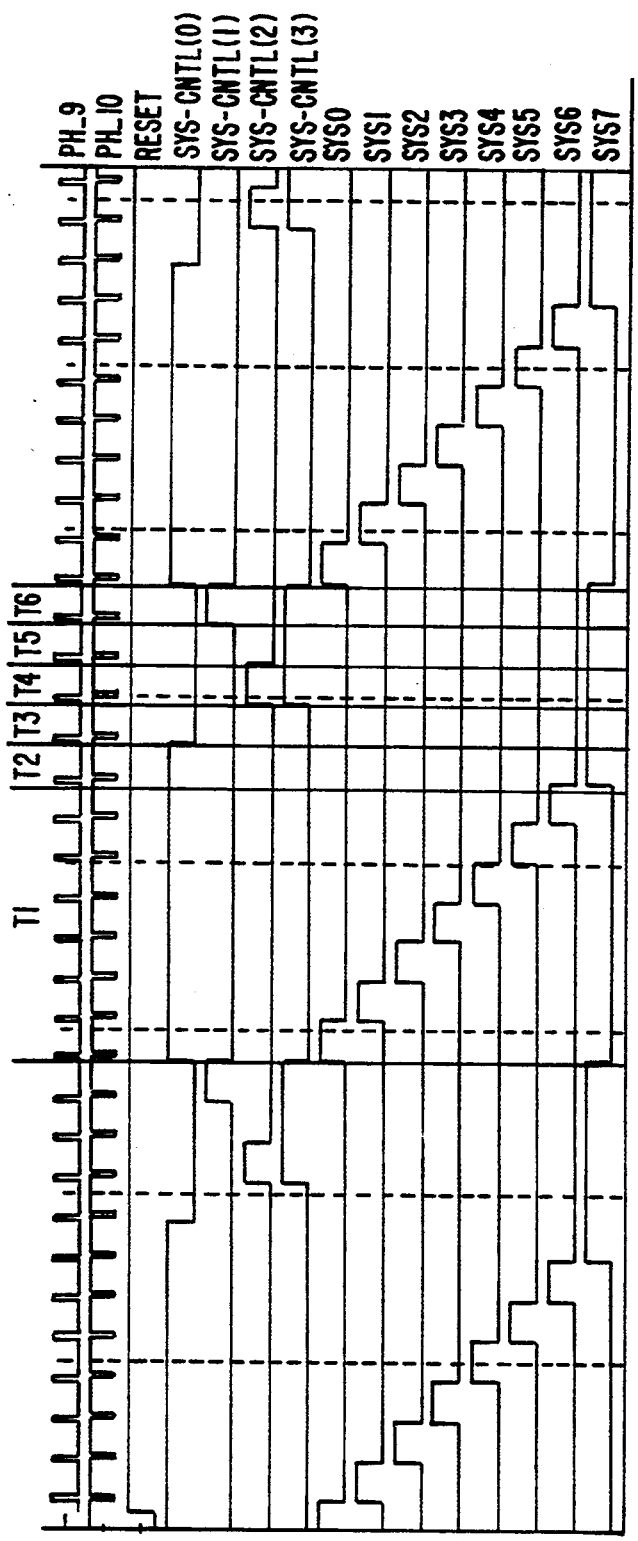
FIG._4.

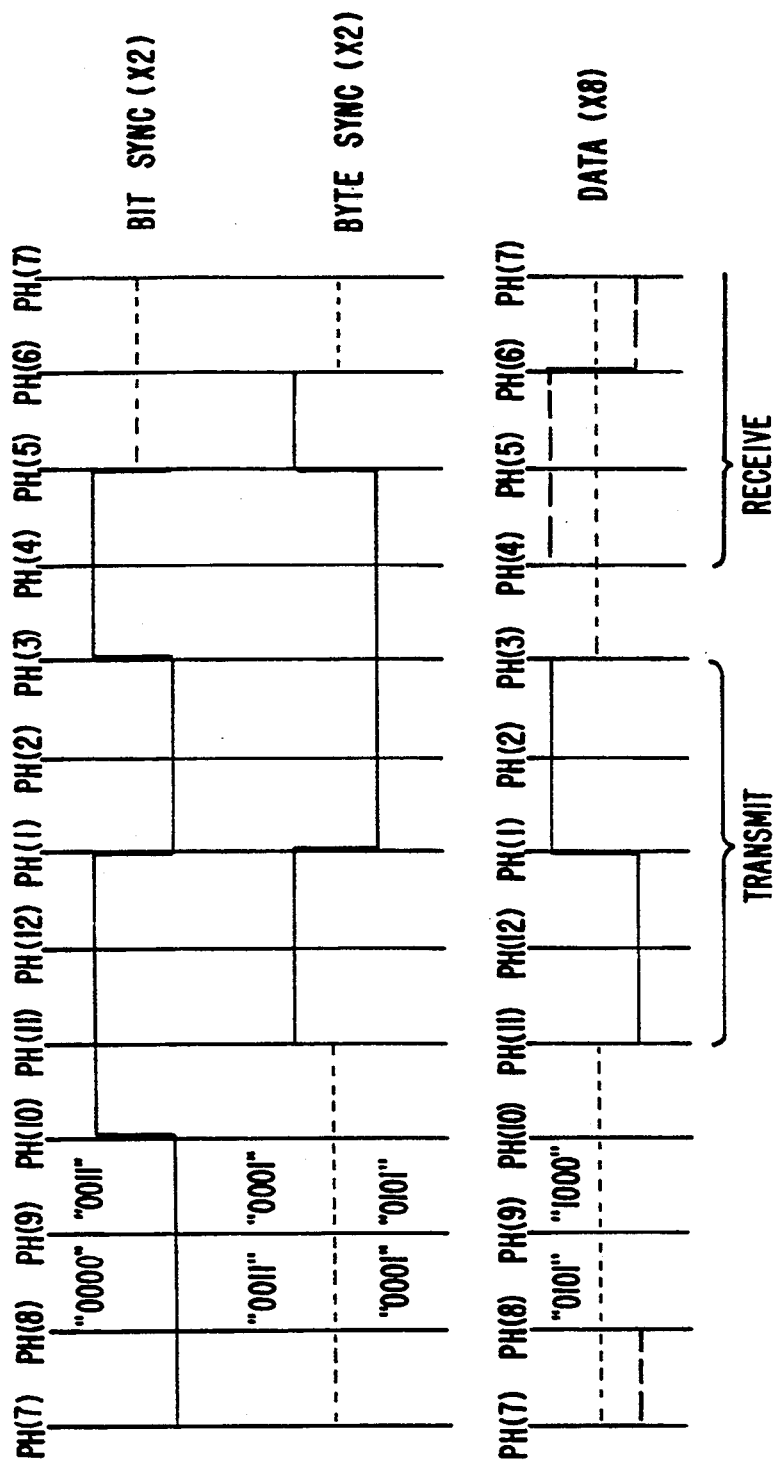
FIG._6.

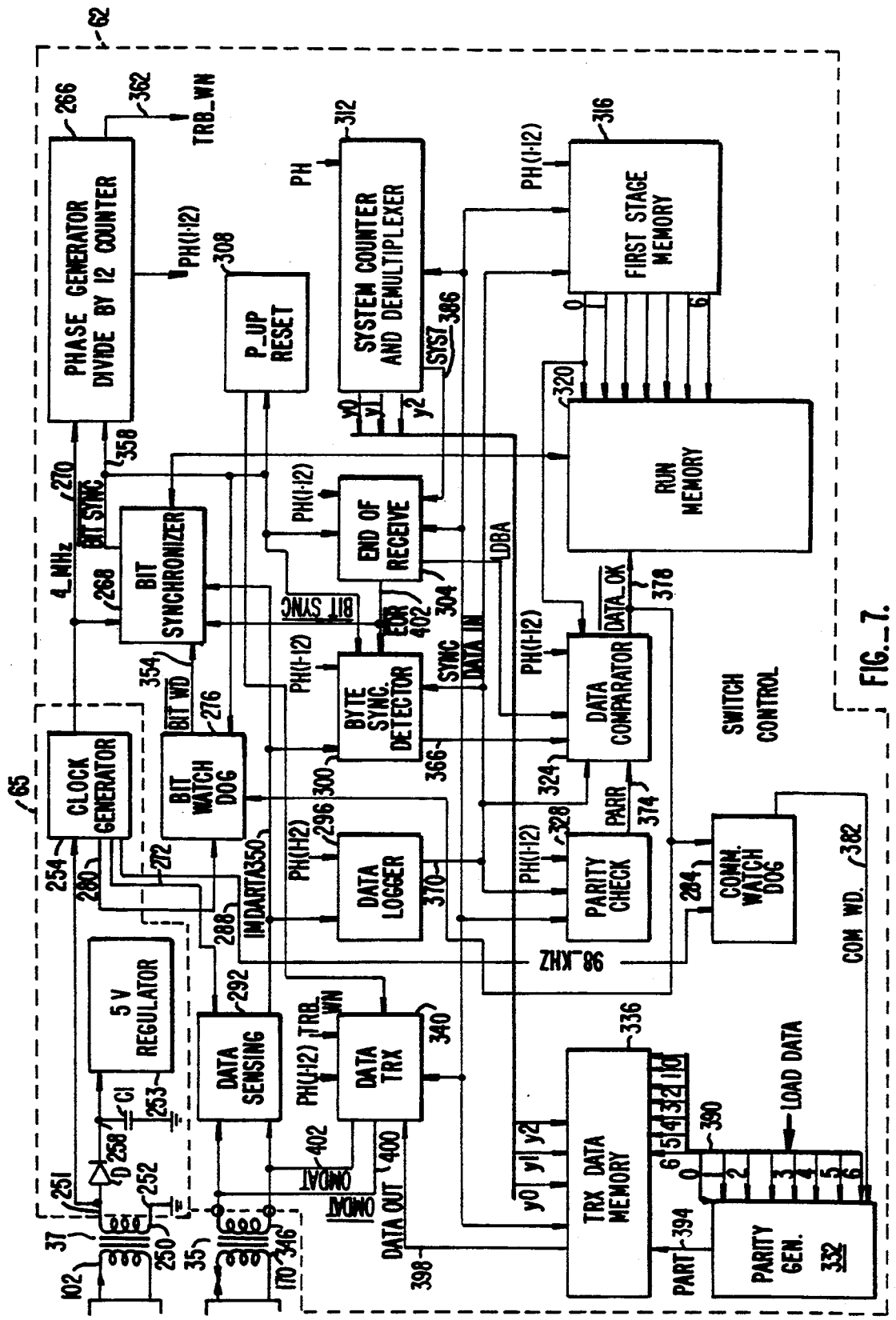
FIG._7.

CIRCUIT FOR PROVIDING ISOLATION BETWEEN COMPONENTS OF A POWER CONTROL SYSTEM AND FOR COMMUNICATING POWER AND DATA THROUGH THE ISOLATION MEDIA

This is a continuation of application Ser. No. 07/668,374, filed Mar. 11, 1991, now abandoned, which application is a continuation of U.S. Ser. No. 07/511,871, filed Apr. 19, 1990, now abandoned, which is a continuation of U.S. Ser. No. 07/208,157, filed Jun. 17, 1988, now abandoned.

BACKGROUND OF THE INVENTION

1. Field of the Invention

The invention relates generally to interface circuits for industrial automation systems and, more specifically, to interface circuits for power control and power management in applications such as intelligent power supplies and systems requiring local power device sense and control capability, in addition to the ability to transmit both power and system control information across a high voltage isolation barrier.

2. Description of the Relevant Art

Reduced to bare essentials, an industrial process may be regarded as having a number of sensors and loads that correspond to input and output variables for a process control computer system. The sensors provide input values representative of the state of the process at a given time; the loads respond to output values, and thereby control various aspects of the process. Typical sensors include relay contacts, proximity switches, and pressure switches. Typical loads include contractor coils of starters for large motors, solenoid valves, relays, lamps, and small motors. A process may have several hundred to several thousand input sensors and loads that must be serviced at very frequent intervals.

A typical computer system for automating an industrial process contains a number of general and special purpose computers. The system monitors input variables from the process, performs suitable logical manipulations on the inputs, and updates output variables for the process. The computer system is usually organized hierarchically. A host processor, typically a minicomputer or a mainframe, communicates with a number of programmable controllers, each of which communicates with a number of power control subsystems through a number of local processors. A programmable controller is a processor designed specifically to perform logical manipulations on a large number of binary inputs on a cyclical basis. The local processors have as their primary function the efficient transfer of data between the power control subsystems and the working memories of the programmable controllers. The power control subsystems provide the interface between the local processors and the various sensors and loads.

A factory automation system, such as described above, must be provided with suitable electrical isolation between the local processor side and the high voltages on the load side of the power control subsystems. The possibility of a short circuit between a motor running from any line voltage (AC or DC, single phase or more) and the programmable controller or local processor directing it or the host processor is horrible to contemplate, particularly in terms of economic cost and danger to human life.

Optical isolators are almost always used to provide an isolation barrier able to withstand voltages on the order of 2500 volts AC. Optical isolators have their limitations, however, since they are unidirectional in character, and, if bidirectional communication through the isolation media is desired, two couplers per channel must be provided. Furthermore, optical isolators are unable to deliver power across the barrier. Since optimum flexibility in sensing and controlling demands that a barrier be provided between each local processor and the load side of each of its power control subsystems, as well as between each of the power control subsystems, each subsystem therefore requires a separate isolated power supply. This adds greatly to cost and complexity of the overall system. Finally, the performance of optical isolators degrades with use due to physical shifting of components, so frequent repair and/or replacement of the isolation circuitry is required.

SUMMARY OF THE INVENTION

The present invention is directed to an industrial automation system providing isolation between low and high voltage components within the system and communication of power and data through the isolation media. In one embodiment of the invention, transformers are used to isolate the low and high voltage components within the system. A first transformer is used to transmit clock signals from a system interface chip to a load interface chip. The load interface chip derives power for operating the components within the chip from the clock signals. Data is transmitted across a second transformer using messages. Each message comprises a bit sync field, a byte sync field, and a data field. The bit sync field and byte sync field are sensed by the load interface chip, and are used to synchronize the load interface chip with the system interface chip. Once the chips are synchronized, data reception and transmission between the two may be effected.

In the disclosed embodiment, a given byte of data is transmitted at least twice, and data integrity is ensured by comparing each byte with its predecessor, as well as checking a parity bit, by the receiving circuit. To enhance the speed of data transmission, data transmission and reception are interleaved on a bit-by-bit basis. That is, after each bit is transmitted from the system interface chip to the load interface chip, a corresponding bit is transmitted from the load interface chip to the system interface chip. Interleaving transmission and reception of data in this manner allows transmission rates on the order of 600K baud. The high data transmission rate allows the use of very small transformers, without the concern of transformer saturation. Interleaving data transmission on a bit-by-bit basis also permits bidirectional communication over a single line. After each byte of data is transmitted and received, the load interface chip purposely eliminates sychronization between the chips, and must therefore resynchronize itself with the system interface chip before further data may be transmitted and received.

BRIEF DESCRIPTION OF THE DRAWINGS

FIG. 1 is a high level block diagram illustrating the hierarchical structure of a computer system for controlling an automated industrial process.

FIG. 2 is a detailed block diagram of a power control subsystem which interfaces the local processors to the drivers and sensors while providing electrical isolation.

FIG. 3 is a detailed block diagram of the internal communications circuit and clock driver of FIG. 2.

FIG. 4 is a timing diagram for signals generated by the system control module of FIG. 3.

FIG. 5 is a diagram of the format for messages communicated across the data transformer of FIG. 3.

FIG. 6 is a timing diagram showing the format of data communication across the data transformer of FIG. 3.

FIG. 7 is a detailed block diagram of the power circuitry and data transmitter/receiver shown in FIG. 2.

DETAILED DESCRIPTION OF THE PREFERRED EMBODIMENT

The present invention is drawn to a communications subsystem providing isolation between low and high voltage components within the system and communication of power and data through the isolation media. As an aid to understanding the environment in which the invention operates, a general description of a factory automation system is set forth below.

OVERVIEW OF COMPUTER SYSTEM

FIG. 1 is a high level block diagram of a factory automation computer system. The system has a tree-like configuration with a host processor 12 (typically a mainframe) at the root and a large number of power control subsystems 15 (with associated sensors 17 and loads 18) at the ends of the branches. Host processor 12 and power control subsystems 15 are connected by a network of programmable controllers 20 and local processors 22. Programmable controllers 20 are special purpose processors optimized for performing logical manipulations on large numbers of binary variables. Each programmable controller communicates with a number (e.g., 8 or 16) of local processors, each of which communicates with a number (e.g., 8 or 16) of power control subsystems.

Each power control subsystem 15 includes a system-side portion 15a and a load-side portion 15b that communicates across a 2500-volt isolation barrier 25. During operation, signals from the local processor continuously update the command to apply power to, or remove it from, the load. Likewise, diagnostic data from the sensor is continuously communicated to the local processor.

OVERVIEW OF POWER CONTROL SUBSYSTEM

FIG. 2 is a detailed block diagram of one of power control subsystems 15. In a preferred implementation, subsystem 15 comprises a pair of CMOS chips, referred to as system interface chip 27 and load interface chip 30, a pair of MOS power switching devices 32 and 33, one or two isolation transformers, referred to as data transformer 35 and clock transformer 37, and a small number of other discrete components. As shown in FIG. 2, the primary and secondary terminals of the isolation barrier are independently grounded. This prevents non-data voltages from elements coupled to one side of the isolation barrier from affecting the operation of elements coupled to the other side of the isolation barrier.

System interface chip 27 is a 5-volt CMOS chip which operates on the controller/processor/system side of isolation barrier 25, and it communicates with the host system. Pinout connections include DATA, AC/DC, WRITE, READ, RUN/PGM, CHIP ENABLE, RESET, and CLOCK, as well as terminals for the transformers and voltage and ground terminals.

System interface chip 27 includes host communication circuitry 40, internal communications circuitry 42, switch control circuitry 43, data conditioning circuitry 45, filter circuits 47, and a clock driver 50.

Host communications circuitry 40 provides a bidirectional serial communication link on the DATA line with a protocol easily implemented by most microprocessors. During normal operation, with the RUN/PMG (high) and CHIP ENABLE (low), the host communication circuitry receives a 3-bit serial command word on the DATA line. Pulses on the WRITE line clock the data bits into the chip providing a handshake. The data words are analyzed and, if their pattern or number of bits is incorrect, the data is rejected and the host informed. Similarly, 8-bit status words are transmitted to the host when appropriate handshake clock pulses appear on the READ line. In the programming mode, with RUN/PMG (low), 7-bit serial words are transmitted to chip 27 to set the subsystem's default conditions, sense input's set points, and filter time constants, and verification words are returned to the local processor.

Internal communications circuitry 42 is responsible for communicating data across the isolation barrier to load interface chip 30. The link with the load interface chip is via data transformer 35, using Manchester encoding. Internal communications circuitry 42 encodes checked and processed data received from the host, adds a parity bit, and sends the data at 600 Kilobaud to data transformer 35, and hence across the barrier.

Clock driver 50 derives its timing from the CLOCK input (e.g., 4 MHz) and communicates a version of this signal to clock transformer 37, and hence to load interface chip 30. As will be discussed below, the clock signal which is transmitted across clock transformer 37 provides both a clock signal and power to load interface chip 30.

Load interface chip 30 is an 18-volt CMOS chip which operates in conjunction with a pair of MOS switching devices 32 and 33. These are preferably insulated gate bipolar transistors (IGBT's) which, while slower than power MOSFET's, are more rugged and less expensive for a given current carrying capability. Two IGBT's are used for controlling AC power, while only one IGBT is needed for controlling DC power. The load interface chip includes data transmitting/receiving circuitry 60, power circuitry 65, sense control circuitry 67, pulse test circuitry 70, switch control circuitry 72, an IGBT gate driver 75, temperature and current sense circuitry 77, voltage sense circuitry 80, and a voltage reference generator 82 as shown in FIG. 2, load interface chip 30 is grounded independently of system interface chip 27 to ensure isolation between the two interfaces.

Data transmitting/receiving circuitry 60 is coupled to the secondary side of data transformer 35 to provide the basic data communication across the isolation barrier. It decodes the incoming data signals, but checks parity before latching. Each byte is transmitted at least twice. Each incoming byte is compared with its predecessor, and its structure is checked for compliance with the Manchester encoding scheme. Similar checking occurs in the reverse direction. Watchdog timers on both chips 27 and 30 alert the subsystem to communication link failure, and put it in a programmed default condition.

Power circuitry 65 is coupled to the secondary of clock transformer 37, and includes on-chip rectifiers, filters, regulators, and references to provide power to the remaining portions of the chip. The 5-volt signal from clock driver 50 on chip 27 is stepped up by clock transformer 37 to a 13–14 volt peak-to-peak waveform. This is rectified and used to develop a 10-volt supply voltage for chip 30 and a 5-volt reference (via voltage reference generator 82) to set the trip points for current and voltage sensing circuitry 77 and 80. Power circuitry 65 also includes a circuit for limiting inrush current during initial turn-on of the power supply.

Switch control circuitry 72 and IGBT gate driver 75 control the gates on the IGBT's. Switch control circuitry 72 is preprogrammed to call for "switch open," "switch closed," or "no change" when the subsystem goes into a default condition. Gate driver 75 can handle capacitive loads up to 5000 pf.

Temperature and current sense circuitry 77 provides signals from temperature sensing diodes and current mirrors on the IGBT's. The current sense trip point can be programmed, but the temperature trip point is fixed. When the permissible die temperature or maximum selected current of either switch is exceeded, it is turned off within two microseconds and the host notified. Temperature and current sense circuitry 77 has the ability to accurately sense currents less than 50 $\mu$A, as well as currents of 40 A or more.

Four lines, designated L1, CO, CI, and L2, connect chip 30 and the IGBT's to the load and high voltage line. L1 ties the line to one side of the IGBT switch, and CO ties the other side of the IGBT switch to the load. CI connects to the contact of the device sensing load status and through it, if closed, to the line. L2 connects to the low side of the line AC common). Four 1-megohm resistors link the four lines to corresponding inputs on voltage sense circuitry 80 where they provide the load status sense inputs. Current difference circuitry in the voltage sense circuitry 80 senses line voltage, customer input voltage, and customer output voltage.

SYSTEM SIDE COMMUNICATION CIRCUITRY

Data transformer 35, clock transformer 37, internal communication circuit 42, clock driver 50, data transmitter/receiver 60, and power circuit 65 provide isolation between system interface chip 27 and load interface chip 30, as well as power and data communication between the two chips. FIG. 3 is a block diagram of those components contained within system interface chip 27 (i.e., internal communication circuit 42 and clock driver 50). Clock driver 50 receives, for example, 4 MHz clock signals over a clock line 100, and converts the clock signals into currents which flow through primary winding 102 of clock transformer 37 via a CLK-D line 106 and a CLK-D-N line 108. Clock driver 50 preferably comprises gated FETs for flowing current in opposite directions through primary winding 102 of clock transformer 37, depending on the value of the clock signal. For example, when a high signal is received over clock line 100, current flows from CLK-D line 106, through primary winding 102, and thereafter to CLK-D-N line 108. Similarly, when a low signal is received on clock line 100, current flows from CLK-D-N line 108, through primary winding 102, and thereafter to CLK-D line 106. The operation of clock driver 50 may be altered by a reset signal received over a reset line 110, which, in turn, is coupled to gating mechanisms within clock driver 50.

Internal communication circuit 42 comprises a phase generating circuit 114, a data transmitter/receiver 118, an input buffer 122, a data multiplexer 126, a system control circuit 130, a parity generator circuit 134, a memory 138, a data log 142, a parity check circuit 146, a data comparator 150, and a switch data circuit 154. The functions of these modules are discussed below. Internal communication circuit 42 receives data from a data input line 158, and bidirectionally communicates data to data transformer 35 through a DATA-TRX line 162 and a DATA-TRX-N line 166, both of which are coupled to a primary winding 170 of data transformer 35.

Phase generating circuit 114 and system control circuit 130 provide the timing signals for controlling the system. Phase generating circuit 114 preferably functions as a divide-by-12 counter for dividing the frequency of clock pulses received over clock line 100 into a 12-pulse period. In this embodiment, phase generating circuit 114 comprises a plurality of serially connected flip-flops for forming a shift register. A single high bit is shifted through the successive stages of the shift register. Each flip-flop output terminal is connected to one line of 12-bit PH lines 170 for communicating the state of the shift register chain to the other parts of the system. A line is considered active when it is connected to the flip-flop which has a high signal on its output terminal. In this embodiment, PH (1–12) comprise the successive outputs of the shift register chain, so a high signal will appear serially from PH (1) through PH (12). Phase generating circuit 114 may include gating connected to the flip-flops to ensure that extraneous bits are not allowed to enter and propagate through the shift register chain. The state of phase generating circuit 114 is reset by a signal received over reset line 110.

System control circuit 130 receives signals appearing on PH lines 170 (e.g., PH (9) and PH (10)) and converts those signals into multiple-bit signals appearing on 8-bit SYS lines 174 and 4-bit SYS-CNTL lines 178. As with the signals on PH lines 170, the signals appearing on SYS lines 174 comprise a single serially shifted bit, or high signal, appearing on one of the lines. On the other hand, the signals appearing on SYS-CNTL lines 178 comprise unique bit patterns held for a prescribed length of time. System control circuit 130 may be reset by a signal appearing on reset line 110.

FIG. 4 shows the format and timing of signals appearing on SYS (0–7) and on SYS-CNTL (0–3). Also shown are the exemplary input signals PH (9) and PH (10). At the beginning of time T1 (on PH (10) high), the signals on SYS-CNTL (014 3) are "1000," respectively, and the signal on SYS (0) is high. A high signal then is propagated from SYS (1) through SYS (6) during the remainder of time T1. At time T2, SYS (7) goes high. However, unlike the signals on SYS (0) through SYS (6), the signal on SYS (7) does not go low at the end of time T2, but remains high through time T6. It is during time T3–T6 that the bit pattern on SYS-CNTL lines 178 change. For example, at time T3, the bit pattern appearing on SYS-CNTL (0–3) is "0000," respectively, the bit pattern at time T4 is "0011," the bit pattern at time T5 is "0001," and the bit pattern at time T6 is "0101." The reason for this shall be discussed later. The signal on SYS (7) may be used as an enabling signal for the logic which generates the bit patterns on SYS-CNTL lines 178. At the end of time T6, the bit pattern on SYS-CNTL lines 178 revert to "1000," the signal on SYS (7) goes low, and the cycle begins again with a high signal on SYS (0).

Input buffer 122 receives data to be transmitted to load interface chip 30 on 7-bit DATA-X lines 158, and latches the data in response to signals received from SYS-CNTL line 178. In this embodiment, the latches comprising input buffer 122 load and store the input data in response to the signals appearing on SYS-CNTL (2), which, as shown in FIG. 4, is active during time T4 for causing the data to be loaded and stored prior to the following bit cycle on SYS lines 174. Thereafter, the latched data is communicated to data multiplexer 126 and parity generator 134 over 7-bit DATA-B lines 182. Input buffer 122 may be cleared by a signal received from reset line 110.

Parity generator 134 is a conventional parity-bit generator which calculates the parity of the input data and generates a parity bit on a parity line 186. The parity bit appearing on line 186 is communicated to data multiplexer 126.

Data multiplexer 126 receives the seven data bits on DATA-B line 182 and the parity bit on parity line 186, and serially communicates the data and parity bit to data transmitter/receiver 118 over a DATA-OUT line 190 in response to the signals received over SYS lines 174. Within data multiplexer 126, the data from DATA-B lines 182 and the parity bit from parity line 186 may be applied in parallel to suitable gating circuitry, and the serial signals on SYS lines 174 may be used to serially gate the seven data bits and the parity bit to data transmitter/receiver 118.

Data transmitter/receiver 118 forms messages from the data received on DATA-OUT line 190, the clock signals from PH lines 170, and the signals from SYS-CNTL lines 178. The messages are thereafter transmitted on DATA-TRX line 162 and DATA-TRX-N line 166, which, in turn, are coupled to primary winding 170 of data transformer 35 for flowing current in opposite directions depending on the value of each bit. In addition to transmitting data through data transformer 35, data transmitter/receiver 118 also receives data through data transformer 35 on the same lines used to transmit the data. The received data are thereafter transmitted to data log 142 through DATA-IN lines 194. Data transmitter/receiver 118 may be reset by a signal applied to reset line 110.

The format of the messages communicated from system interface chip 27 to load interface chip 30 is shown in FIG. 5. Each message comprises a preamble field and a data field. In this embodiment, each message occupies a time interval of 144 clock cycles. The preamble is transmitted during the first 48 clock cycles, and the data field is transmitted during the remaining 96 clock cycles. The preamble consists of a bit-sync field and a byte-sync field. Both fields occupy clock cycles each, and they cause load interface chip 30 to synchronize itself with system interface chip 27. FIG. 5 also shows the relationship between the preamble field and the data field to the bit patterns appearing on SYS-CNTL lines 178. That is, the bit-sync field exists when the patterns "0000" and "0011" appear on SYS-CNTL lines 178; the byte-sync field exists during bit patterns "0001" and "0101"; and the data field exists during the bit pattern "1000."

FIG. 6 is a timing diagram which illustrates the format of the bit-sync, byte-sync, and data fields. In this embodiment, the bit patterns appearing on SYS-CNTL lines 178 are combined with the signals on PH lines 170 to create the bit patterns shown. Of course, the bit patterns could be generated in other ways if desired.

A bit-sync field begins with the transmission drivers being in a tristate condition from PH (9) through PH (6) of bit pattern "0000" (not shown). Thereafter, a low transmission signal appears during the time that a high signal appears on PH (7) and PH (8) of bit pattern "0000." At the occurrence of a high signal on PH (9), the bit pattern changes to "0011," but a low transmission signal is maintained. This initiates synchronization of load interface chip 30 with system interface chip 27. Thereafter, a high transmission signal appears during PH (10) through PH (12); a low transmission signal appears during PH (1) and PH (2); a high transmission signal appears during PH (3) and PH (4); a low transmission signal appears during PH(5) and PH(6); and then the transmission drivers revert to a tristate condition. This tristate condition is maintained through the bit pattern transition from "0011" to "0001" (which signifies the beginning of the byte sync field) until PH (11). A high transmission signal then appears during PH (11) and PH (12); a low transmission signal appears during PH (1) through PH (4); and a high transmission signal appears during PH (5) and PH (6). After PH (5), the transmission drivers revert to a tristate condition, through the bit pattern transition from "0001" to "0101," whereupon the pattern repeats itself. When the bit pattern makes the transition from "0101" to "1000," load interface chip 30 should have completed its synchronization with system interface chip 27, and data then may be communicated between the chips.

In this embodiment, data is communicated between the chips using Manchester encoding. This occurs during time T1 of FIG. 4 as the data is multiplexed from data multiplexer 126 to data transmitter/receiver 118 in response to the signals appearing on SYS lines 174. The timing of data transmission is shown in the lower portion of FIG. 6. During the time a high signal appears on PH (8) through PH (10), the drivers driving DATA-TRX line 162 and DATA-TRX-N line 166 are in a tristate condition (indicated by a dotted line). From PH (11) through PH (2), DATA-TRX line 162 and DATA-TRX-N line 166 are enabled for data transmission. This is a transmission window during which a bit of Manchester-encoded data is communicated through data transformer 35. In this embodiment, the Manchester encoded transition occurs at the rising edge of PH (1). From PH (3) through PH (10), the drivers driving DATA-TRX line 162 and DATA-TRX-N line 166 are again in a tristate condition. During this time, a bit of data may be received from load interface chip 30. In this embodiment, the window for receiving data from load interface chip 30 is from PH (3) through PH (7) (indicated by dash-lines). The Manchester-encoded transition point of the received data occurs at PH (6). The sequence is repeated eight times, one for each bit of data received from data multiplexer 126. Thus, it can be seen that data transmission and reception according to the present invention are interleaved on a bit basis.

As data is received by data transmitter/receiver 118 from load interface chip 30, it is serially communicated to data log 142 over DATA-IN line 194 in response to signals received over PH lines 170. Data log 142 samples the reception window (PH (4) through PH (7)) to ensure the existence of a transition within the window, and indicates the bit represented by the transition on an REC-DATA line 198. Data log 142 may be reset by a signal appearing on reset line 110.

Each decoded bit then is communicated over REC-DATA line 198 to memory 138. The data also is communicated to parity-check circuit 146 and data-compare circuit 150. Parity-check circuit 146 checks the parity of the eight bits of data, and communicates the result of the parity check to data-compare circuit 150 over a PAR-OK line 202. The signal on PAR-OK line 202 is reset at the beginning of each byte. A parity reset signal also is communicated to data-compare circuit 150 over a PAR-RST line 206 at the beginning of each byte.

The purpose of memory 138 is to store each byte of data received from load-interface chip 30. The reason for this is because transmission and reception of data are duplicated. That is, in this embodiment, each message, and hence each byte of data, is transmitted at least twice. Each time a byte is received, it is stored in memory 138. Each time a new byte is received, each bit received on REC-data line 198 is compared by DATA-COMPARE-CIRCUIT 150 to the data previously stored in memory 138 and received over 7-bit INT-BUS lines 210. If every bit of the incoming byte matches the corresponding bits in the stored byte, and if parity is okay, a valid data signal is generated on a DATA-OK line 214 to indicate that fact. If a match does not occur, a valid data signal is not generated, and the newly received byte is stored in memory 138 for comparison with the next byte to be received. Data compare circuit is reset by the signal on PAR-RST line 206 at the beginning of each byte.

As the data is being compared by data-compare circuit 150, the seven bits of data are received in parallel by switch data circuit 154 over INT-BUS line 210. The data is latched within switch data circuit 154 and, if the valid data signal appears on DATA-OK line 214, the data is communicated to the rest of the system on 7-bit DATA-R lines 218.

LOAD SIDE COMMUNICATION CIRCUITRY

FIG. 7 is a detailed block diagram of power circuitry 65 and data transmitter/receiver 62. As shown in FIG. 7, power circuitry 65 is coupled to a secondary winding 250 of clock transformer 37 through lines 251 and 252, and it includes a diode D1, a capacitor C1, a voltage regulator 253, and a clock generator 254. Diode D1 is connected to line 251 and rectifies the current flowing therefrom. Line 252 is coupled to a ground potential. Alternatively, diode D1 may be replaced by a full wave rectifying diode bridge placed across lines 251 and 252 if desired. The current flowing out of diode D1 is communicated to a capacitor C1, which stores the power necessary for operating the components within load interface chip 30. The other terminal of capacitor C1 is coupled to a ground potential. Connected to a node 258 between capacitor C1 and diode D1 is 5-volt regulator 253 which provides a 5-volt voltage reference for the chip.

Clock generator 254 is connected to secondary winding 250 through line 251, and converts the pulsing current flowing through secondary winding 250 into clock signals, e.g., 4-MHz, 125-KHz, and 0.98-Khz clock signals, which are used for timing various events in the system. The lower frequency clock signals may be derived from the 4-MHz clock signal by suitable frequency dividers. The 4-MHz clock signal is communicated to a phase generator 266 and to a bit synchronizer 268 in data transmitter/receiver 62 over a line 270. The 125-KHz signal is communicated to a bit watchdog circuit 276 in data transmitter/receiver 62 over a line 280, and the 0.98-Khz clock signal is communicated to a communication watchdog circuit 284 in data transmitter/receiver circuit 60 over a line 288.

In addition to the above-mentioned phase generator 266, bit synchronizer 268, bit watchdog circuit 276, and communication watchdog circuit 284, data transmitter/receiver 62 comprises a data-sensing circuit 292, a data logger 296, a byte sync detector 300, an end-of-receive circuit 304, a reset circuit 308, a system counter and demultiplexer 312, a first-stage memory 316, a run memory 320, a data comparator 324, a parity-check circuit 328, a parity-generating circuit 332, a transmission data memory 336, and a data transmitter 340.

Data-sensing circuit 292 is coupled to a secondary winding 346 of data transformer 35 for receiving data from system interface chip 27. Data-sensing circuit 292 converts the current flowing through secondary winding 346 into logic signals corresponding to the bits transmitted by system interface chip 27. The input data then is transferred to data logger 296, byte sync detector 300, and bit synchronizer 268 over an IMDATA line 350.

Data logger 296 and byte sync detector 300 do not operate until bit synchronizer 268 synchronizes load interface chip 30 with system interface chip 27. Bit synchronizer 268 receives the input data on IMDATA line 350 and attempts to detect the bit synchronization fields in the received message. This may be accomplished by a plurality of flip-flops interconnected in a recursive manner for detecting the bit pattern in the bit sync field. The initial zeros in the bit sync field (FIG. 6) may be used to initialize the flip-flops. Once the correct bit pattern is detected, a bit sync signal is latched and communicated to phase generator 266, reset circuit 308, end-of-receive circuit 304, byte-sync detector 300, and bit watchdog circuit 276 for enabling these circuits.

Bit synchronizer 268 receives a signal from bit watchdog circuit 276 over a bit-WD line 354. Bit watchdog circuit 276 is a timer which times out at approximately 300 μsec, providing ample time for the preamble to be received and detected by bit synchronizer 268. If a bit sync signal is not received by bit watchdog circuit 276 within that time, a signal appears on bit-WD line 354 for resetting bit synchronizer 268, and the system attempts to synchronize the chip from the beginning.

The function of phase generator 266 is the same as phase generator 114 in system interface chip 27, and it is the purpose of the bit sync signal appearing on bit-sync line 358 to ensure that the signals generated by phase generator 266 occur at the same time as the signals generated by phase generator 114 PH (1) in phase generator 266 occurs at the same time as PH (1) in phase generator 114, up to a fixed delay). Additionally, phase generator 266 generates a high signal on a TRB-WN line 362 starting on the rising edge of PH (4) through PH (7), for creating a transmission window for data to be communicated to system interface chip 27. As with phase generator 114 in system interface chip 27, phase generator 266 may comprise a plurality of serially connected flip-flops. Synchronization of the clock signals may be accomplished by holding the flip-flops in a predetermined state until the bit sync signal appears on bit-sync line 358, whereupon serial shifting of a single high signal begins.

Byte-sync detector 300 receives the bit sync signal over bit-sync line 358 and the synchronized clock pulses from phase generator 266, and it is connected to IMDATA line 350 for sensing the correct bit pattern in the byte-sync fields of the transmitted message. In this embodiment, byte sync detector 300 is not enabled until the bit sync signal is received. As with bit synchronizer 268, bit pattern detection may be accomplished by a recursive flip-flop network forming a state machine or by some other method. When the correct bit pattern is sensed, a byte sync signal is generated on a BYTE SYNC line 366. This signal is communicated to system counter and demultiplexer 312, first-stage memory 316, end-of-receive circuit 304, data comparator 324, parity check circuit 328, transmission data memory 336, and data transmitter 340 for enabling these circuits to process the forthcoming data.

Once enabled, data logger 296 latches the incoming data from IMDATA line 350 and communicates the data over a DATA-IN line 370 to first-stage memory 316, data comparator 324, and parity-check circuit 328 over a DATA-IN line 370. These circuits perform the same function as the equivalent circuits in system interface chip 27. As noted previously, the data is transmitted at least twice, so first-stage memory 316 stores each byte of data received, and data-comparator 324 serially compares each bit of data in first-stage memory 316 with the corresponding bits of the next received byte of data to detect correspondence. Simultaneously therewith, parity-check circuit 328 checks the parity of the incoming data and, if the parity is correct, issues a valid parity signal to data comparator 324 over a PARR line 374. If data comparison is successful and if parity is correct, data comparator 324 issues a valid data signal on a DATA-OK line 378 to run memory 320 and to communication watchdog circuit 284. A valid data signal appearing on DATA-OK line 378 causes run memory 320 to latch the input data from first-stage memory 316, and the latched data then may be used by other components in the system.

Communication watchdog circuit 284 is a timer which times-out after approximately 10ms, which is adequate time for data to be received and processed by data comparator 324. If communication watchdog 284 times out before a valid data signal is received on DATA-OK line 378, it communicates a signal on a COM-WD line 382 to parity generator 332, indicating that a communication failure probably has occurred. Parity generator 332 incorporates this information into a parity bit, which is appended to the data transmitted to system interface chip 27.

System counter and demultiplexer 312 receives signals from phase generator 266 and serially generates eight 3-bit signals on lines Y(0)–Y(2) for serially addressing transmission data memory 336. Additionally, system counter and demultiplexer 312 communicates a SYS 7 signal on an SYS (7) line 386 to end-of-receive circuit 304. The signal appearing on SYS (7) line 386 functions in the same manner as the SYS (7) signal generated by system interface chip 27. That is, it indicates when the last bit of data has been received (or transmitted).

Load data from sensors, etc., coupled to the driven load are communicated to parity generator 332 and transmission data memory 336 over 7-bit LOAD DATA lines 390. At the same time, parity generator 332 calculates the parity of the load data and communicates a parity bit to transmission data memory 336 over a PART line 394. The seven bits of data plus the parity bit then are latched into transmission data memory 336 upon the occurrence of the BYTE SYNC signal on byte sync line 366. In response to the signals received over lines Y(0)–Y(2), data is serially gated out of transmission data memory 336 to data transmitter 340 over a DATA-OUT line 398. Thereafter, data transmitter 340 converts each bit into a signal suitable for driving secondary winding 346 of data transmitter 35 through lines 400 and 402. When the transmission window signal is received over TRB-WN line 362, data transmitter 340 drives data transformer 35. As noted previously, data is communicated to system interface chip 27 in a window defined by PH (4) through PH (7). As with system interface chip 27, Manchester encoding is used for data transmission. When load-interface chip 30 is not transmitting, its drivers are in a tristate condition.

Data is received and transmitted by load interface chip 30 as long as the appropriate bit sync and byte sync signals appear on bit sync line 358 and byte sync line 366, respectively. When the last bit of information is being received and transmitted by load-interface chip 30, a signal is generated by system counter and demultiplexer 312 on SYS 7 line 386. This signal is latched by end-of-receive circuit 304, which thereafter generates a signal on an EOR line 402 to byte sync detector 300 and bit synchronizer 268. When this signal is received, bit synchronizer 268 removes the bit-sync signal from BIT SYNC line 358, and byte sync detector 300 removes the BYTE SYNC signals from byte sync line 366. This resets phase generator 266, and therefore eliminates synchronization with system interface chip 27. Removal of the bit sync and the byte sync signals also inhibits the other units to which the signals are connected from processing any further data. Additionally, when the bit sync signal is removed, reset circuit 308 issues a reset signal to data transmitter 340 to maintain the transformer drivers in a tristate condition. Thus, load-interface chip 30 must be resynchronized with system interface chip 27 before any further data may be processed.

Thus, in operation, system interface chip 27 transmits pairs of messages comprising a preamble and one byte of data to load-interface chip 30. The preamble causes load-interface chip 30 to synchronize to the transmission of data by system-interface chip 27, and data is received accordingly. As each bit of data is transmitted by system interface chip 27 to load interface chip 30, a bit of data is transmitted from load-interface chip 30 to system-interface chip 27 immediately thereafter. Thus, during the time period spanned by each message, one byte of data is transmitted by system-interface chip 27, and one byte of information is transmitted by load-interface chip 30, with data transmission being interleaved on a bit-by-bit basis. By interleaving the transmission of data bits in this manner, a very high transmission rate, on the order of 600K baud, may be effected. This, in turn, permits the use of very small transformers for data transmission without concern about transformer saturation.

After the byte of data has been transmitted and received by system-interface chip 27 and load-interface chip 30, load-interface chip 30 is desynchronized from system-interface chip 27, and must then be resynchronized before data again may be transmitted and received by that chip. This ensures continuous synchronization, and therefore data integrity in a noisy environment, even at the high transmission rates noted.

While the above is a complete description of a preferred embodiment of the present invention, various modifications may be employed. Consequently, the scope of the invention should not be limited except as described in the claims.

It is claimed:

1. A circuit for isolating a high voltage power switch from a low voltage controller comprising:
   a transformer for providing galvanic isolation between a primary input terminal and a secondary output terminal thereof;
   first communication means for coupling the controller to the primary input terminal of the transformer;
   second communication means for coupling the power switch to the secondary output terminal of the transformer so that the controller is galvanically isolated from the power switch;
   wherein the first communication means communicates data comprising a plurality of bits to the second communication means through the transformer and wherein the second communication means communicates data comprising a plurality of bits to the first communication means through the transformer; and
   wherein each bit communicated from the first communication means to the second communication means is interleaved with each bit communicated from the second communication means to the first communication means.

2. The circuit according to claim 1 wherein data is communicated between the first communication means and the second communication means at a rate exceeding 9600 baud.

3. A method of isolating a high voltage power switch module from a low voltage controller comprising the steps of:
   coupling the power switch module to the secondary output terminal of a transformer;
   coupling the controller to a primary input terminal of the transformer so that the controller is galvanically isolated from the power switch module;
   communicating data comprising a plurality of bits from the controller to the power switch module through the transformer;
   communicating data comprising a plurality of bits from the power switch module to the controller through the transformer;
   interleaving each bit communicated from the controller to the power switch module with each bit communicated from the power switch module to the controller.

4. The method according to claim 3 further comprising the step of communicating data between the controller and the power switch module at a rate exceeding 9600 baud.

* * * * *